US009890967B2

(12) United States Patent
Buduri

(10) Patent No.: US 9,890,967 B2
(45) Date of Patent: Feb. 13, 2018

(54) SYSTEMS AND METHODS FOR HVAC AND IRRIGATION CONTROL

(71) Applicant: Trane International Inc., Piscataway, NJ (US)

(72) Inventor: Arun Kumar Buduri, Chennai (IN)

(73) Assignee: Trane International Inc., Piscataway, NJ (US)

(*) Notice: Subject to any disclaimer, the term of this patent is extended or adjusted under 35 U.S.C. 154(b) by 699 days.

(21) Appl. No.: 14/012,761

(22) Filed: Aug. 28, 2013

(65) Prior Publication Data

US 2015/0066215 A1    Mar. 5, 2015

(51) Int. Cl.
G05B 13/00 (2006.01)
F24F 11/00 (2018.01)
G05B 15/02 (2006.01)
A01G 9/24 (2006.01)
A01G 25/16 (2006.01)

(52) U.S. Cl.
CPC .......... *F24F 11/0009* (2013.01); *A01G 9/246* (2013.01); *A01G 9/247* (2013.01); *F24F 11/0086* (2013.01); *G05B 15/02* (2013.01); *A01G 25/16* (2013.01); *G05B 2219/2642* (2013.01)

(58) Field of Classification Search
CPC ....... F24F 11/0009; A01G 9/247; A01G 9/246
USPC ............ 700/276; 454/229; 47/21.1; 239/723
See application file for complete search history.

(56) References Cited

U.S. PATENT DOCUMENTS

| 5,801,940 | A | 9/1998 | Russ et al. |
| 7,092,768 | B1 | 8/2006 | Labuda |
| 7,424,291 | B1 | 9/2008 | Lunsford et al. |
| 7,778,736 | B2 | 8/2010 | Sutardja |
| 8,412,382 | B2 | 4/2013 | Imes et al. |
| 8,639,391 | B1 * | 1/2014 | Alberth, Jr. ............ G05B 15/02 340/657 |
| 8,736,561 | B2 | 5/2014 | Anzures et al. |
| 9,158,292 | B2 * | 10/2015 | Quail .................. H04L 12/2809 |
| 2004/0013468 | A1 * | 1/2004 | Kadner ................ A01G 25/165 405/37 |
| 2007/0070066 | A1 | 3/2007 | Bakhash |
| 2008/0125057 | A1 | 5/2008 | Nass et al. |
| 2009/0001182 | A1 | 1/2009 | Siddaramanna et al. |
| 2009/0128558 | A1 | 5/2009 | Morello et al. |
| 2010/0106309 | A1 | 4/2010 | Grohman et al. |
| 2011/0155354 | A1 | 6/2011 | Karamanos et al. |
| 2012/0159597 | A1 | 6/2012 | Thomas et al. |
| 2012/0203382 | A1 * | 8/2012 | Nourian ................ A01G 25/16 700/284 |
| 2013/0123991 | A1 | 5/2013 | Richmond |
| 2014/0267112 | A1 | 9/2014 | Dunn et al. |

(Continued)

OTHER PUBLICATIONS

Buduri, Arun Kumar; U.S. Appl. No. 14/012,757, filed Sep. 18, 2013; "Systems and Methods for HVAC and Irrigation Control;".

(Continued)

Primary Examiner — Mohammad Ali
Assistant Examiner — Sheela S Rao
(74) Attorney, Agent, or Firm — Conley Rose, P.C.; J. Robert Brown, Jr.

(57) ABSTRACT

A heating, ventilation, and/or air conditioning (HVAC) system has an irrigation subsystem and an HVAC system controller configured to selectively implement a drought related irrigation subsystem control scheme.

17 Claims, 5 Drawing Sheets

(56) References Cited

U.S. PATENT DOCUMENTS

2014/0267716 A1     9/2014   Child et al.
2014/0316583 A1    10/2014   Ambriz et al.

OTHER PUBLICATIONS

Hunter; "EC Residential Irrigation Controller; 2, 4, or 6 Station Indoor or Outdoor Versions Owner's Manual and Programming Instructions"; 2004; 34 pages.
Hamernik, P., et al.; "Classification of Functions in Smart Home"; International Journal of Information and Education Technology, vol. 2, No. 2, Apr. 2012; pp. 149-155.
Office Action dated Feb. 17, 2016; U.S. Appl. No. 14/012,757, filed Sep. 18, 2013; 26 pages.
Office Action dated Oct. 6, 2016; U.S. Appl. No. 14/012,757, filed Sep. 18, 2013; 28 pages.
Cortexa Techonology, Inc.; "Cortexa Owner's Manual"; http://www.cortexatechnologies.com/; 2006; 85 pages.
Final Office Action dated Jun. 7, 2017; U.S. Appl. No. 14/012,757, filed Sep. 18, 2013; 44 pages.
Final Office Action dated May 31, 2016; U.S. Appl. No. 14/012,757, filed Sep. 18, 2013; 29 pages.
Advisory Action dated Jul. 8, 2016; U.S. Appl. No. 14/012,757, filed Sep. 18, 2013; 7 pages.
Advisory Action dated Aug. 1, 2016; U.S. Appl. No. 14/012,757, filed Sep. 18, 2013; 7 pages.

\* cited by examiner

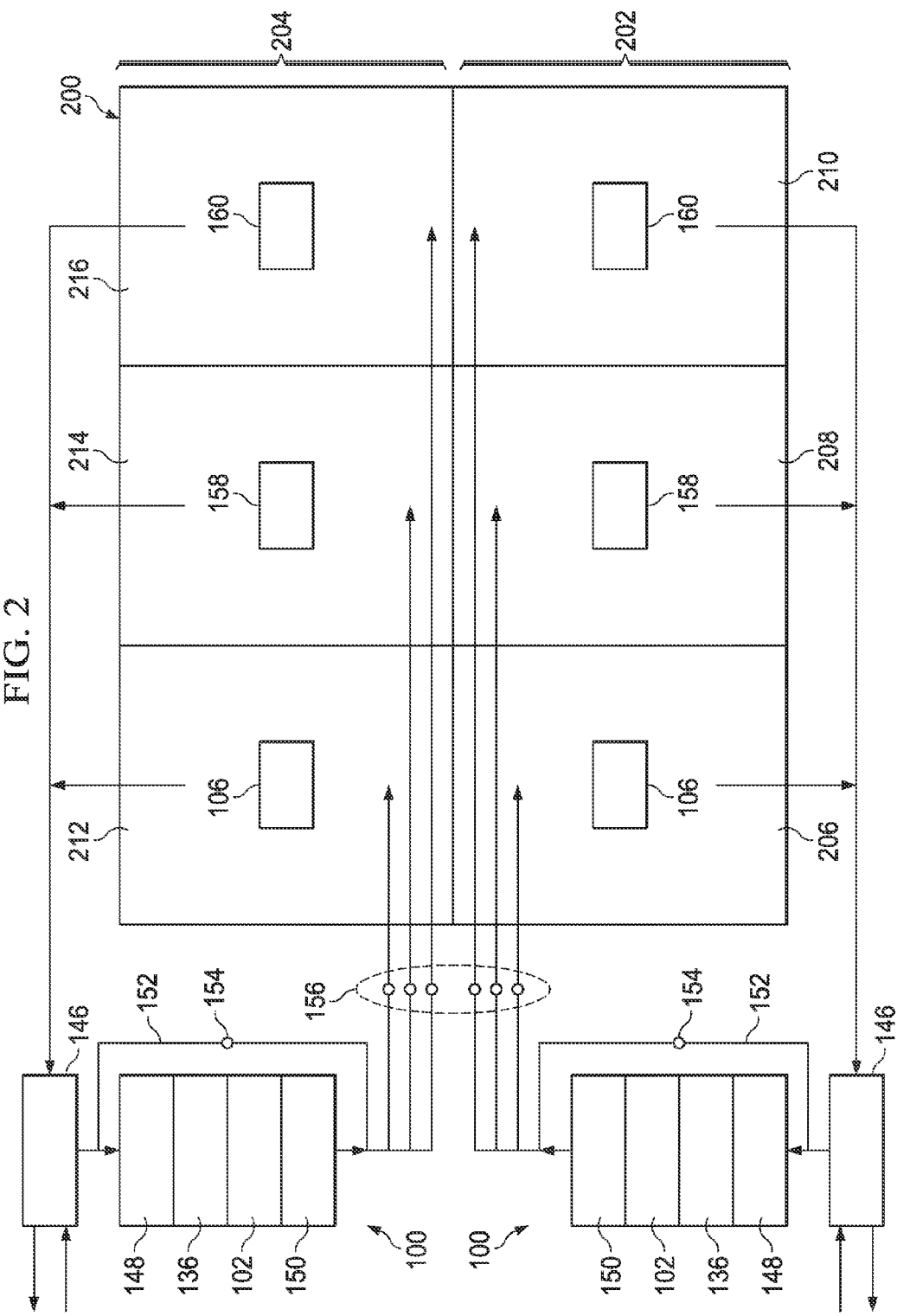

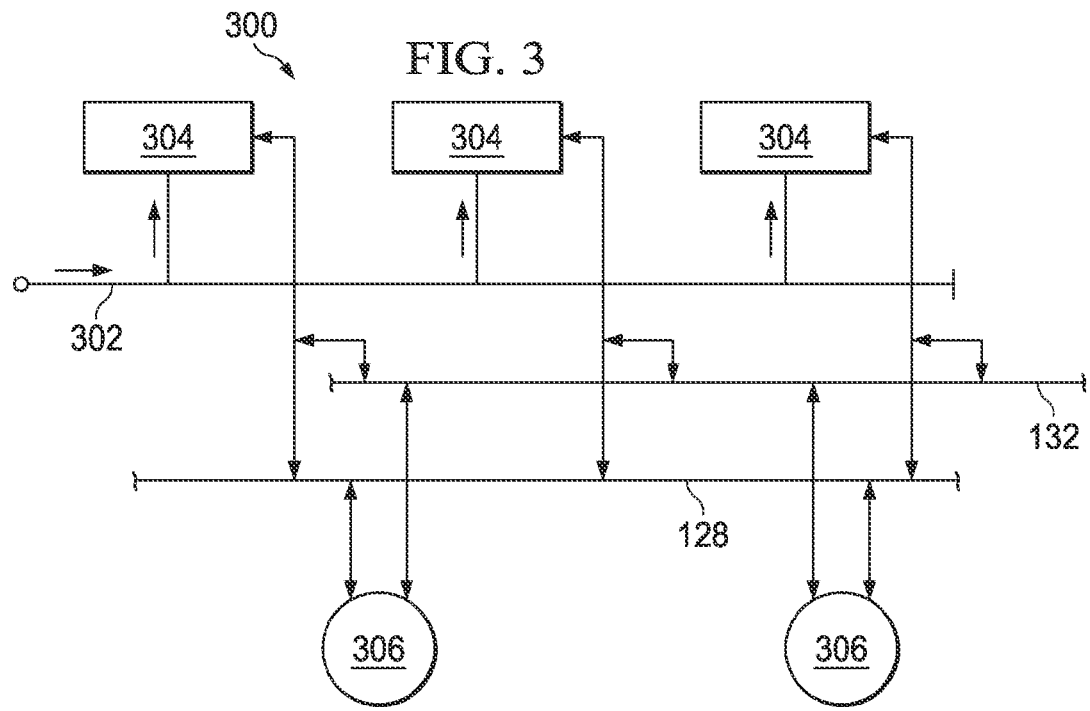
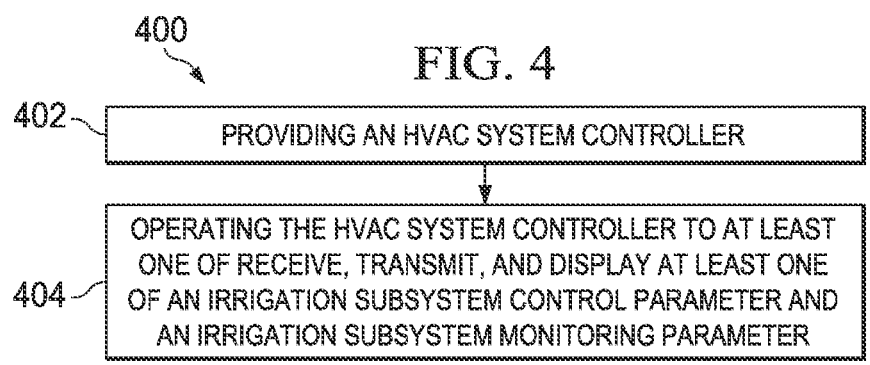
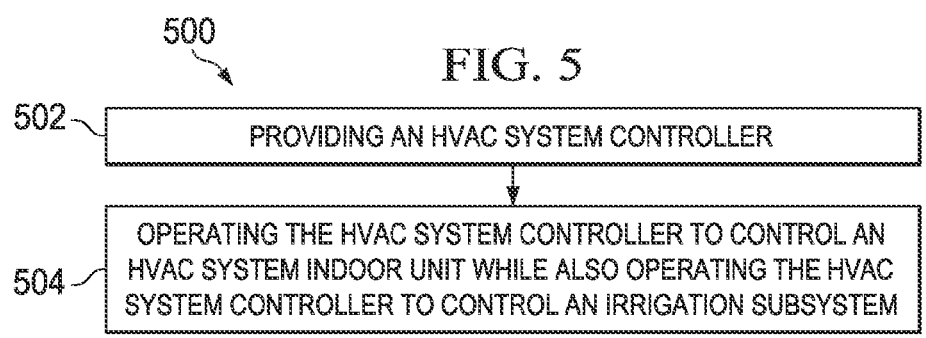

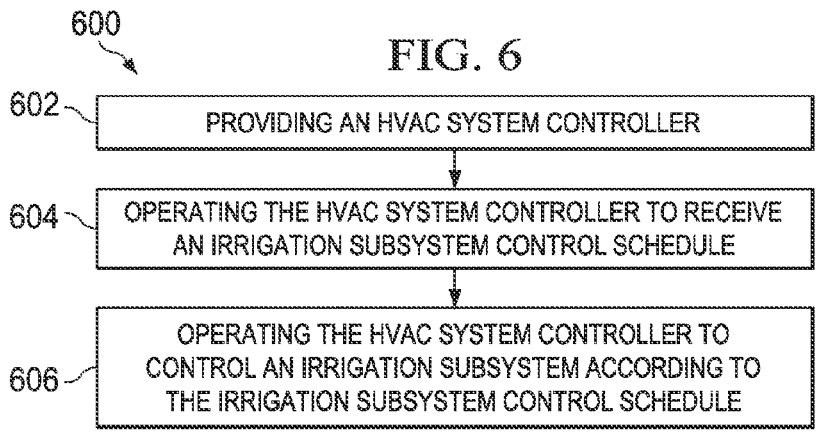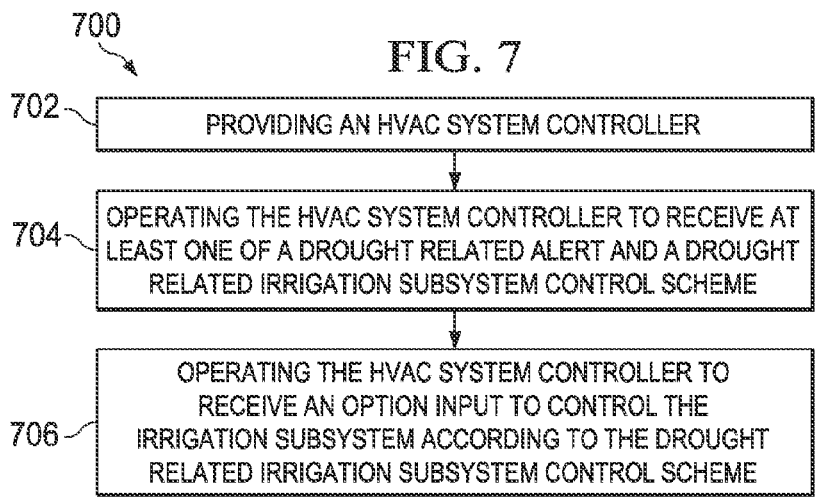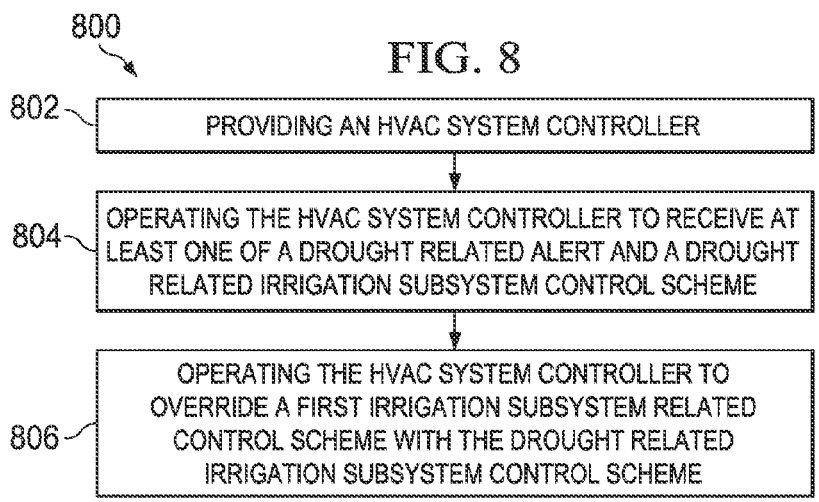

SYSTEMS AND METHODS FOR HVAC AND IRRIGATION CONTROL

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Irrigation systems and/or sprinkler systems may be controlled by single purpose irrigation controllers. The single purpose irrigation controllers may be inconveniently located. The single purpose irrigation controllers may control irrigation systems based on a schedule. Schedule based irrigation may waste water under some environmental circumstances.

BRIEF DESCRIPTION OF THE DRAWINGS

FIG. 2 is a simplified schematic diagram of the air circulation paths of the HVAC system of FIG. 1;

FIG. 3 is schematic representation of an irrigation subsystem of the HVAC system of FIG. 1;

FIG. 4 is a flowchart of a method of operating an HVAC system;

FIG. 5 is a flowchart of another method of operating an HVAC system;

FIG. 6 is a flowchart of yet another method of operating an HVAC system;

FIG. 7 is a flowchart of still another method of operating an HVAC system;

FIG. 8 is a flowchart of another method of operating an HVAC system;

DETAILED DESCRIPTION

Figure 1:
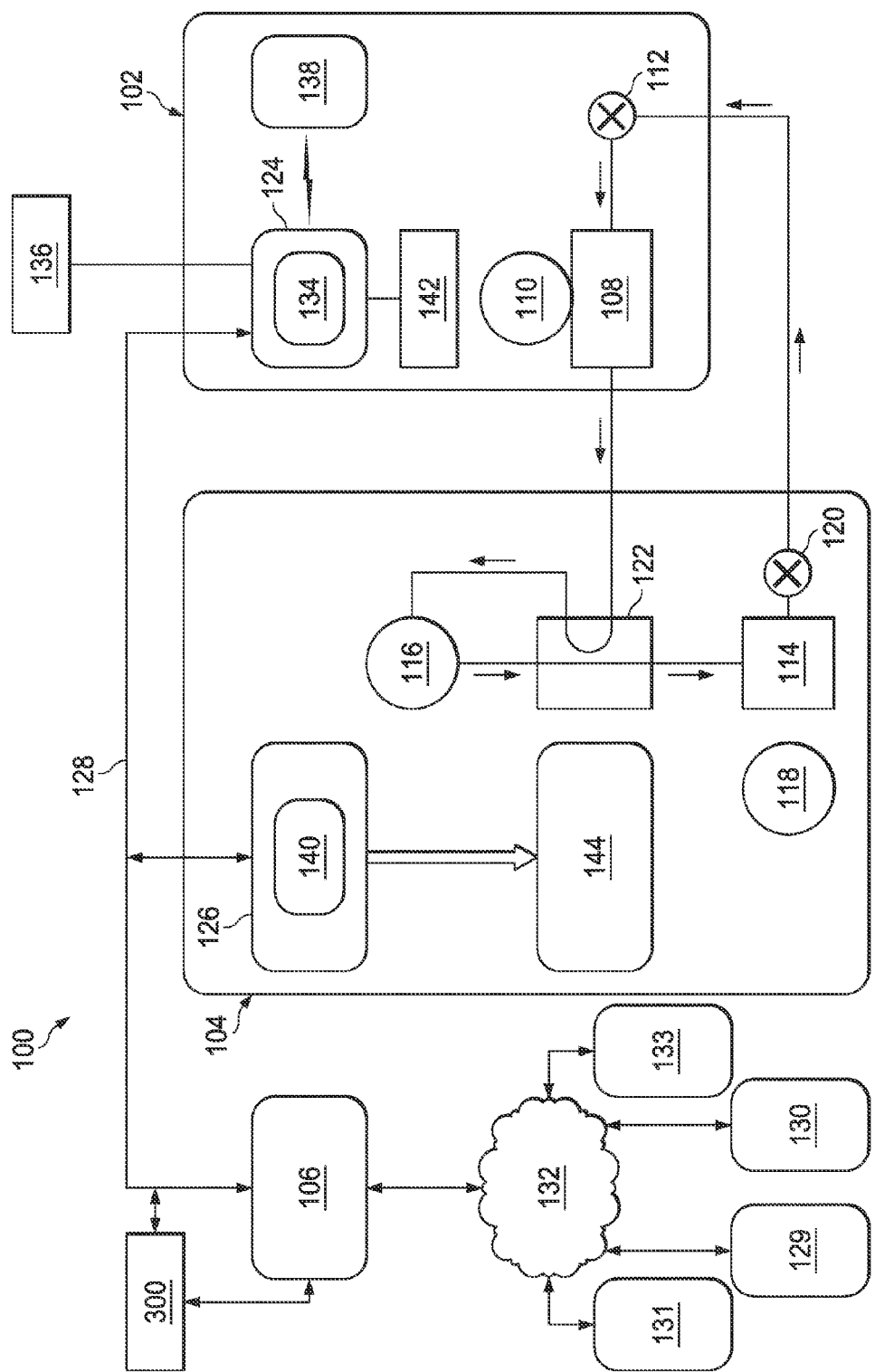
FIG. 1 is a schematic diagram of an HVAC system according to an embodiment of the disclosure.

Referring now to FIG. 1, a schematic diagram of an HVAC system 100 according to an embodiment of this disclosure is shown. HVAC system 100 comprises an indoor unit 102, an outdoor unit 104, and a system controller 106. In some embodiments, the system controller 106 may operate to control operation of the indoor unit 102 and/or the outdoor unit 104. As shown, the HVAC system 100 is a so-called heat pump system that may be selectively operated to implement one or more substantially closed thermodynamic refrigeration cycles to provide a cooling functionality and/or a heating functionality.

Indoor unit 102 comprises an indoor heat exchanger 108, an indoor fan 110, and an indoor metering device 112. Indoor heat exchanger 108 is a plate fin heat exchanger configured to allow heat exchange between refrigerant carried within internal tubing of the indoor heat exchanger 108 and fluids that contact the indoor heat exchanger 108 but that are kept segregated from the refrigerant. In other embodiments, indoor heat exchanger 108 may comprise a spine fin heat exchanger, a microchannel heat exchanger, or any other suitable type of heat exchanger.

The indoor fan 110 is a centrifugal blower comprising a blower housing, a blower impeller at least partially disposed within the blower housing, and a blower motor configured to selectively rotate the blower impeller. In other embodiments, the indoor fan 110 may comprise a mixed-flow fan and/or any other suitable type of fan. The indoor fan 110 is configured as a modulating and/or variable speed fan capable of being operated at many speeds over one or more ranges of speeds. In other embodiments, the indoor fan 110 may be configured as a multiple speed fan capable of being operated at a plurality of operating speeds by selectively electrically powering different ones of multiple electromagnetic windings of a motor of the indoor fan 110. In yet other embodiments, the indoor fan 110 may be a single speed fan.

The indoor metering device 112 is an electronically controlled motor driven electronic expansion valve (EEV). In alternative embodiments, the indoor metering device 112 may comprise a thermostatic expansion valve, a capillary tube assembly, and/or any other suitable metering device. The indoor metering device 112 may comprise and/or be associated with a refrigerant check valve and/or refrigerant bypass for use when a direction of refrigerant flow through the indoor metering device 112 is such that the indoor metering device 112 is not intended to meter or otherwise substantially restrict flow of the refrigerant through the indoor metering device 112.

Outdoor unit 104 comprises an outdoor heat exchanger 114, a compressor 116, an outdoor fan 118, an outdoor metering device 120, and a reversing valve 122. Outdoor heat exchanger 114 is a spine fin heat exchanger configured to allow heat exchange between refrigerant carried within internal passages of the outdoor heat exchanger 114 and fluids that contact the outdoor heat exchanger 114 but that are kept segregated from the refrigerant. In other embodiments, outdoor heat exchanger 114 may comprise a plate fin heat exchanger, a microchannel heat exchanger, or any other suitable type of heat exchanger.

The compressor 116 is a multiple speed scroll type compressor configured to selectively pump refrigerant at a plurality of mass flow rates. In alternative embodiments, the compressor 116 may comprise a modulating compressor capable of operation over one or more speed ranges, the compressor 116 may comprise a reciprocating type compressor, the compressor 116 may be a single speed compressor, and/or the compressor 116 may comprise any other suitable refrigerant compressor and/or refrigerant pump.

The outdoor fan 118 is an axial fan comprising a fan blade assembly and fan motor configured to selectively rotate the fan blade assembly. In other embodiments, the outdoor fan 118 may comprise a mixed-flow fan, a centrifugal blower, and/or any other suitable type of fan and/or blower. The outdoor fan 118 is configured as a modulating and/or variable speed fan capable of being operated at many speeds over one or more ranges of speeds. In other embodiments, the outdoor fan 118 may be configured as a multiple speed fan capable of being operated at a plurality of operating speeds by selectively electrically powering different ones of multiple electromagnetic windings of a motor of the outdoor fan 118. In yet other embodiments, the outdoor fan 118 may be a single speed fan.

The outdoor metering device 120 is a thermostatic expansion valve. In alternative embodiments, the outdoor metering device 120 may comprise an electronically controlled motor driven EEV, a capillary tube assembly, and/or any other suitable metering device. The outdoor metering device 120 may comprise and/or be associated with a refrigerant check valve and/or refrigerant bypass for use when a direction of refrigerant flow through the outdoor metering device 120 is such that the outdoor metering device 120 is not intended to meter or otherwise substantially restrict flow of the refrigerant through the outdoor metering device 120.

The reversing valve 122 is a so-called four-way reversing valve. The reversing valve 122 may be selectively controlled to alter a flow path of refrigerant in the HVAC system 100 as described in greater detail below. The reversing valve 122 may comprise an electrical solenoid or other device configured to selectively move a component of the reversing valve 122 between operational positions.

The system controller 106 may comprise a touchscreen interface for displaying information and for receiving user inputs. The system controller 106 may display information related to the operation of the HVAC system 100 and may receive user inputs related to operation of the HVAC system 100. However, the system controller 106 may further be operable to display information and receive user inputs tangentially and/or unrelated to operation of the HVAC system 100. In some embodiments, the system controller 106 may comprise a temperature sensor and may further be configured to control heating and/or cooling of zones associated with the HVAC system 100. In some embodiments, the system controller 106 may be configured as a thermostat for controlling supply of conditioned air to zones associated with the HVAC system 100.

In some embodiments, the system controller 106 may selectively communicate with an indoor controller 124 of the indoor unit 102, with an outdoor controller 126 of the outdoor unit 104, and/or with other components of the HVAC system 100. In some embodiments, the system controller 106 may be configured for selective bidirectional communication over a communication bus 128. In some embodiments, portions of the communication bus 128 may comprise a three-wire connection suitable for communicating messages between the system controller 106 and one or more of the HVAC system 100 components configured for interfacing with the communication bus 128. Still further, the system controller 106 may be configured to selectively communicate with HVAC system 100 components and/or other device 130 via a communication network 132. In some embodiments, the communication network 132 may comprise a telephone network and the other device 130 may comprise a telephone. In some embodiments, the communication network 132 may comprise the Internet and the other device 130 may comprise a so-called smartphone and/or other Internet enabled mobile telecommunication device.

The indoor controller 124 may be configured to receive information inputs, transmit information outputs, and otherwise communicate with the system controller 106, the outdoor controller 126, and/or any other device via the communication bus 128 and/or any other suitable medium of communication. In some embodiments, the indoor controller 124 may be configured to communicate with an indoor personality module 134, receive information related to a speed of the indoor fan 110, transmit a control output to an electric heat relay, transmit information regarding an indoor fan 110 volumetric flow-rate, communicate with and/or otherwise affect control over an air cleaner 136, and communicate with an indoor EEV controller 138. In some embodiments, the indoor controller 124 may be configured to communicate with an indoor fan controller 142 and/or otherwise affect control over operation of the indoor fan 110. In some embodiments, the indoor personality module 134 may comprise information related to the identification and/or operation of the indoor unit 102 and/or a position of the outdoor metering device 120.

In some embodiments, the indoor EEV controller 138 may be configured to receive information regarding temperatures and pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112.

The outdoor controller 126 may be configured to receive information inputs, transmit information outputs, and otherwise communicate with the system controller 106, the indoor controller 124, and/or any other device via the communication bus 128 and/or any other suitable medium of communication. In some embodiments, the outdoor controller 126 may be configured to communicate with an outdoor personality module 140 that may comprise information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the outdoor fan 118, a compressor sump heater, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with a compressor drive controller 144 that is configured to electrically power and/or control the compressor 116.

The HVAC system 100 is shown configured for operating in a so-called cooling mode in which heat is absorbed by refrigerant at the indoor heat exchanger 108 and heat is rejected from the refrigerant at the outdoor heat exchanger 114. In some embodiments, the compressor 116 may be operated to compress refrigerant and pump the relatively high temperature and high pressure compressed refrigerant from the compressor 116 to the outdoor heat exchanger 114 through the reversing valve 122 and to the outdoor heat exchanger 114. As the refrigerant is passed through the outdoor heat exchanger 114, the outdoor fan 118 may be operated to move air into contact with the outdoor heat exchanger 114, thereby transferring heat from the refrigerant to the air surrounding the outdoor heat exchanger 114. The refrigerant may primarily comprise liquid phase refrigerant and the refrigerant may be pumped from the outdoor heat exchanger 114 to the indoor metering device 112 through and/or around the outdoor metering device 120 which does not substantially impede flow of the refrigerant in the cooling mode. The indoor metering device 112 may meter passage of the refrigerant through the indoor metering device 112 so that the refrigerant downstream of the indoor metering device 112 is at a lower pressure than the refrigerant upstream of the indoor metering device 112. The pressure differential across the indoor metering device 112 allows the refrigerant downstream of the indoor metering device 112 to expand and/or at least partially convert to gaseous phase. The gaseous phase refrigerant may enter the indoor heat exchanger 108. As the refrigerant is passed through the indoor heat exchanger 108, the indoor fan 110 may be operated to move air into contact with the indoor heat exchanger 108, thereby transferring heat to the refrigerant from the air surrounding the indoor heat exchanger 108. The refrigerant may thereafter reenter the compressor 116 after passing through the reversing valve 122.

To operate the HVAC system 100 in the so-called heating mode, the reversing valve 122 may be controlled to alter the flow path of the refrigerant, the indoor metering device 112 may be disabled and/or bypassed, and the outdoor metering device 120 may be enabled. In the heating mode, refrigerant may flow from the compressor 116 to the indoor heat exchanger 108 through the reversing valve 122, the refrigerant may be substantially unaffected by the indoor metering device 112, the refrigerant may experience a pressure differential across the outdoor metering device 120, the refrigerant may pass through the outdoor heat exchanger 114, and the refrigerant may reenter the compressor 116 after passing through the reversing valve 122. Most generally, operation of the HVAC system 100 in the heating mode reverses the roles of the indoor heat exchanger 108 and the outdoor heat exchanger 114 as compared to their operation in the cooling mode.

The system 100 may further comprise a sprinkler system and/or irrigation subsystem 300. The irrigation subsystem 300 may generally be associated with the interior and/or exterior irrigation and/or water control devices onsite and/or near the indoor unit 102 and/or outdoor unit 104. In some cases, the irrigation subsystem 300 may be in selective communication with the system controller 106 and/or any other system and/or device via the communication bus 128 and/or the communication network 132. The irrigation subsystem 300 may be controlled according to inputs entered into and/or provided via the system controller 106 which also controls the indoor unit 102 and outdoor unit 104.

Still further, the system controller 106 may be configured to selectively communicate with other systems via the communication network 132. In some embodiments, the system controller 106 may communicate with weather forecast data providers (WFDPs) 133, such as the National Weather Service and The Weather Channel, which may provide weather forecast data via the network 132. In some embodiments, the system controller 106 may communicate with a customized data providers (CDPs) 131, such as home automation service provider authorized by the manufacturer of system controller 106, which may provide weather forecast data specifically formatted for use by system controllers 106.

In this embodiment, the CDP 131 may be designated or authorized by the system controller 106 manufacturer to store data such as a location of an HVAC system 100 installation, HVAC system 100 model number, HVAC system 100 serial number, and/or other HVAC system 100 data for and/or from system controllers 106. Such data may further comprise details on the installation of the HVAC system 100, including features of the buildings, energy suppliers, water suppliers, and physical sites. Such data may further comprise irrigation related details regarding indoor and/or outdoor landscaping that may affect a rate of evapotranspiration, evaporation, plant related transpiration, and/or water pooling. Further irrigation related details may comprise type of plants, type of soil and/or ground, grades of ground and/or plant environment, shading characteristics of indoor and/or outdoor environments.

A thermodynamic model of an environment in which HVAC system 100 is installed may be a simple model comprising just a few parameters, such as, square footage of controlled climate living space, number of floors, and construction type (brick, log, conventional frame, etc.). A thermodynamic model may be more refined, comprising a three dimensional model of the roof (including surface reflectivity, insulation, pitch, orientation), exterior walls, heat conduction through exterior walls, wall construction, wall surface reflectivity, wall orientation, window placement, window type (including, for example, window properties such as reflectivity, number of glazings, type of glazings, type of gas insulation, age, seals, etc.), doors (materials, type, area, seals, etc.), foundation, effective air leakage rates, air exchange due to normal use of doors and windows, surrounding landscape (mountains, hills, valleys, nearby artificial structures, water, trees, bushes), and/or any other data. Further, the thermodynamic model may use a simple or a refined representation of weather. Weather calculations may comprise utilizing a model of sky radiation, cloud cover, solar and shading calculations, radiation reflected from exterior surfaces, air and heat balances, ground heat transfer processes, infrared radiation heat exchanges, convective heat exchanges, moisture transfers, wind speed and direction, and/or any other suitable weather related factor.

A thermodynamic model may also utilize real-world information obtained from mapping services such as the United States Geological Service (USGS) or Internet-based services which provide satellite and aerial image data. Images of the property, together with the orientation of the structure 200, surrounding features and topography may be obtained to augment or replace digital photographs. Alternatively, construction plans of structure 200 and/or irrigation subsystem 300 may be utilized. Once a thermodynamic model of the structure 200 and/or related surroundings is constructed, the physics of the interactions between the building and the related environment may be modeled at varying levels of detail. In some embodiments, temperatures, solar inputs, wind cooling, and air leakages may be reduced to just a few simple numbers representing averages. The averages may be used in calculations with historic and weather forecast data. The thermodynamic model may comprise the location, orientation, thermal resistance value, and reflectivity of each surface of the structure 200 in square inch or square foot units. Solar inputs may be modeled by ray-tracing algorithms. Wind and convective cooling may be modeled by vector fields. Instead of applying heat balance equations to whole walls or windows, each square inch on the surface of the structure 200 may be calculated.

Still further, such data may comprise sensor based feedback regarding water pooling levels, soil humidity, soil resistivity, plant coloration, plant density, rain sensor data, external temperature freeze data, and/or any other environmental and/or irrigation subsystem 300 related variable that may be suitable for utilizing in control and/or analysis of irrigation subsystem 300 operation. Such data may be provided by any of the HVAC system 100 owner, the HVAC system 100 installer, the HVAC system 100 distributor, the HVAC system 100 manufacturer, and/or any other entity associated with the manufacture, distribution, purchase, operation, and/or installation of HVAC system 100. The CDP 131 may also collect, process, store, and/or redistribute information supplied from system controllers 106. Such information may comprise HVAC system 100 service data, HVAC system 100 repair data, HVAC system 100 malfunction alerts, HVAC system 100 operational characteristics, measurements of weather conditions local to the HVAC system 100, energy cost data, HVAC system 100 run times, and/or any other information available to the system controller 106.

CDP 131 may also be configured to gather data from the WFDPs 133 and communicate with other devices 130, such as, telephones, smart phones, and/or personal computers. CDP 131 may also, for example, collect energy and/or resource cost data from another web site and provide the energy and/or resource cost data to system controller 106. CDP 131 may be controlled and operated by any entity authorized to communicate with system controller 106. Authorization for access to system controller 106 may take the form of a password, encryption, and/or any other suitable authentication method. Optionally, authorization may be disabled using system controller 106. CDP 131 may be configured to allow for the setup of account login information to remotely configure system controller 106. For example, the CDP 131 may provide the user an opportunity to configure system controller 106 with a large general purpose computer screen and greater number of interface features than may be available on a user interface of system controller 106, in some cases, allowing the interface of system controller 106 to be smaller and/or eliminated entirely.

System controller 106 may also be configured to communicate with other Internet sites 129. Such other data providers (ODPs) 129 may provide current time and energy and/or resource cost data of the energy and/or resource suppliers for HVAC system 100. For example, system controller 106 may communicate with a local energy provider to retrieve current energy cost data. Similarly, system controller 106 may communicate with a water resource authority responsible for setting and/or disseminating water usage guidelines and/or criteria. In some cases a water resource authority may comprise a municipality that issues changes to water usage guidelines and/or criteria to request and/or control water usage during times of water scarcity, drought, and/or other water demand related factors.

The weather forecast data provided by WFDPs 133 may comprise one or more of predicted: temperatures, solar conditions, sunrise times, sunset times, dew point temperatures, wind chill factors, average wind speeds, wind speed ranges, maximum wind speeds, wind directions, relative humidity, snow, rain, sleet, hail, barometric pressure, heat index, air quality, air pollution, air particulates, ozone, pollen counts, fog, cloud cover, and/or any other available atmospheric and/or meteorological variable that may affect energy consumption of the HVAC system 100 and/or demand and/or operational affects related to the irrigation subsystem 300. The weather forecast data may be retrieved for intervals that span ten days, a week, a day, 4 hours, 2 hours, one hour, a quarter hour, and/or another available interval into the future relative to the time of retrieval.

Referring now to FIG. 2, a simplified schematic diagram of the air circulation paths for a structure 200 conditioned by two HVAC systems 100 is shown. In this embodiment, the structure 200 is conceptualized as comprising a lower floor 202 and an upper floor 204. The lower floor 202 comprises zones 206, 208, and 210 while the upper floor 204 comprises zones 212, 214, and 216. The HVAC system 100 associated with the lower floor 202 is configured to circulate and/or condition air of lower zones 206, 208, and 210 while the HVAC system 100 associated with the upper floor 204 is configured to circulate and/or condition air of upper zones 212, 214, and 216.

In addition to the components of HVAC system 100 described above, in this embodiment, each HVAC system 100 further comprises a ventilator 146, a prefilter 148, a humidifier 150, and a bypass duct 152. The ventilator 146 may be operated to selectively exhaust circulating air to the environment and/or introduce environmental air into the circulating air. The prefilter 148 may generally comprise a filter media selected to catch and/or retain relatively large particulate matter prior to air exiting the prefilter 148 and entering the air cleaner 136. The humidifier 150 may be operated to adjust a humidity of the circulating air. The bypass duct 152 may be utilized to regulate air pressures within the ducts that form the circulating air flow paths. In some embodiments, air flow through the bypass duct 152 may be regulated by a bypass damper 154 while air flow delivered to the zones 206, 208, 210, 212, 214, and 216 may be regulated by zone dampers 156.

Still further, each HVAC system 100 may further comprise a zone thermostat 158 and a zone sensor 160. In some embodiments, a zone thermostat 158 may communicate with the system controller 106 and may allow a user to control a temperature, humidity, and/or other environmental setting for the zone in which the zone thermostat 158 is located. Further, the zone thermostat 158 may communicate with the system controller 106 to provide temperature, humidity, and/or other environmental feedback regarding the zone in which the zone thermostat 158 is located. In some embodiments, a zone sensor 160 may communicate with the system controller 106 to provide temperature, humidity, and/or other environmental feedback regarding the zone in which the zone sensor 160 is located. compare While HVAC systems 100 are shown as a so-called split system comprising an indoor unit 102 located separately from the outdoor unit 104, alternative embodiments of an HVAC system 100 may comprise a so-called package system in which one or more of the components of the indoor unit 102 and one or more of the components of the outdoor unit 104 are carried together in a common housing or package. The HVAC system 100 is shown as a so-called ducted system where the indoor unit 102 is located remote from the conditioned zones, thereby requiring air ducts to route the circulating air. However, in alternative embodiments, an HVAC system 100 may be configured as a non-ducted system in which the indoor unit 102 and/or multiple indoor units 102 associated with an outdoor unit 104 is located substantially in the space and/or zone to be conditioned by the respective indoor units 102, thereby not requiring air ducts to route the air conditioned by the indoor units 102.

Still referring to FIG. 2, the system controllers 106 may be configured for bidirectional communication with each other and may further be configured so that a user may, using any of the system controllers 106, monitor and/or control any of the HVAC system 100 components regardless of which zones the components may be associated. Further, each system controller 106, each zone thermostat 158, and each zone sensor 160 may comprise a humidity sensor. As such, it will be appreciated that structure 200 is equipped with a plurality of humidity sensors in a plurality of different locations. In some embodiments, a user may effectively select which of the plurality of humidity sensors is used to control operation of one or more of the HVAC systems 100.

Referring now to FIG. 3, a schematic representation of an irrigation subsystem 300 is illustrated. Irrigation subsystem 300 generally comprises a water resource supply 302 which may generally be associated with a municipal water supplier or the like and a plurality of controllable water outlets 304 which may generally comprise sprinkler heads, water dripping devices, and/or any other suitable water distribution device. Irrigation subsystem 300 may further comprise irrigation related sensors 306 configured to monitor, record, and/or report irrigation subsystem 300 performance, environmental factors, and/or any other irrigation related data. The water outlets 304 and/or the irrigation related sensors 306 may be in communication with and/or controlled by the system controller 106 and/or any other suitable device and/or service via the communication bus 128 and/or the communication network 132. In some embodiments, the system controller 106, other devices 130, and/or a remote access bridge device may provide and/or allow use of an interface for controlling and/or monitoring the HVAC system 100 including the irrigation subsystem 300. The interface may be, for example, a graphical interface, a touch screen interface, a menu-driven interface, and/or a combination of different types of interfaces.

Referring now to FIG. 4, a flowchart of a method 400 of operating an HVAC system such as HVAC system 100 is shown. The method 400 may begin at block 402 by providing an HVAC system controller such as system controller 106. In some embodiments, the system controller provided may comprise a wall mountable thermostat comprising a touch screen display/interface. The method 400 may continue at block 404 by operating the HVAC system controller to at least one of receive, transmit, and display at least one of (1) an irrigation subsystem control parameter and (2) an irrigation subsystem monitoring parameter. In some embodiments, the irrigation control parameter may comprise one or more of an on-time duration for at least one controllable water outlet such as a controllable water outlet 304. The on-time duration may be associated with another irrigation subsystem control parameter, namely an on-time for a controllable water outlet such as controllable water outlet 304. The on-time control parameter may comprise one or more of a time of day, a day of week, and a date. In some embodiments, controllable water outlets may be individually controllable to the exclusions of other so that a plurality of sets of on-time durations and on-times may be utilized to selectively control a plurality of controllable water outlets in a specific manner over a period of time.

Referring now to FIG. 5, a flowchart of a method 500 of operating an HVAC system such as HVAC system 100 is shown. The method 500 may begin at block 502 by providing an HVAC system controller such as system controller 106. In some embodiments, the system controller provided may comprise a wall mountable thermostat comprising a touch screen display/interface. The method 500 may continue at block 504 by operating the HVAC system controller to simultaneously control both an indoor unit of the HVAC system such as indoor unit 124 as well as an irrigation subsystem such as irrigation subsystem 300. In some embodiments, the indoor unit and the irrigation subsystem may be simultaneously controlled to simultaneously operate to provide heating, cooling, and/or air circulation as well as irrigation, respectively. In other embodiments, one or both of the indoor unit and the irrigation subsystem may be controlled by the HVAC system controller to an off state.

Referring now to FIG. 6, a flowchart of a method 600 of operating an HVAC system such as HVAC system 100 is shown. The method 600 may begin at block 602 by providing an HVAC system controller such as system controller 106. In some embodiments, the system controller provided may comprise a wall mountable thermostat comprising a touch screen display/interface. The method 600 may continue at block 604 by operating the HVAC system controller to receive an irrigation subsystem control schedule. The irrigation subsystem control schedule may comprise one or more of an on-time duration for at least one controllable water outlet such as a controllable water outlet 304. The irrigation subsystem control schedule may also comprise an on-time for a controllable water outlet such as controllable water outlet 304. The on-time control parameter may comprise one or more of a time of day, a day of week, and a date. In some embodiments, controllable water outlets may be individually controllable to the exclusion of others so that a plurality of sets of on-time durations and on-times may be utilized to selectively control a plurality of controllable water outlets in a specific manner over a period of time according to the irrigation subsystem control schedule. The method 600 continues at block 606 by operating the HVAC system controller to control an irrigation subsystem such as irrigation subsystem 300 according to an irrigation subsystem control schedule.

Considering that water is an expensive and limited resource, the HVAC system 100 disclosed herein may be configured and/or controlled to voluntarily conserve water usage in response to drought conditions, forcibly conserve water usage in response to drought conditions, and/or automatically conserve water in response to drought conditions.

Referring now to FIG. 7, a flowchart of a method 700 of operating an HVAC system such as HVAC system 100 is shown. The method 700 may begin at block 702 by providing an HVAC system controller such as system controller 106. In some embodiments, the system controller provided may comprise a wall mountable thermostat comprising a touch screen display/interface. The method 700 may continue at block 704 by operating the HVAC system controller to receive at least one of a drought related alert and a drought related irrigation subsystem control scheme. In some embodiments, the alert may comprise a message and/or may cause a message and/or alert to be presented that at least one of indicates that a drought related alert has been received and/or asks whether a drought related irrigation subsystem control scheme should be implemented. For example, when a drought condition occurs, an ODP 129 such as a municipal water authority may promulgate and/or require that irrigation within the municipality be undertaken according to prescribed limitations, such as irrigating a maximum of one day per week rather than a maximum of two days per week. In some embodiments, the ODP 129 may transmit at least one of the drought related alert and the drought related irrigation subsystem control scheme to the HVAC system 100. Alternatively, a CDP 131 such as a home automation service company may receive the at least one of the drought related alert and the drought related irrigation subsystem control scheme from the ODP 129 or some other source and then transmit one or both of the drought related alert and the drought related irrigation subsystem control scheme to the HVAC system 100. The method 700 may continue at block 706 where the HVAC system controller may prompt a user of the HVAC system for an answer as to whether in view of the drought related alert the HVAC system should implement control of the irrigation subsystem in accordance with the drought related irrigation subsystem control scheme. In some embodiments, a similar method may be utilized to remove implementation of a drought related irrigation subsystem control scheme in response to an ODP removing a drought restriction and/or rescinding a drought related alert.

Referring now to FIG. 8, a flowchart of a method 800 of operating an HVAC system such as HVAC system 100 is shown. The method 800 may begin at block 802 by providing an HVAC system controller such as system controller 106. In some embodiments, the system controller provided may comprise a wall mountable thermostat comprising a touch screen display/interface. The method 800 may continue at block 804 by operating the HVAC system controller to receive at least one of a drought related alert and a drought related irrigation subsystem control scheme. In some embodiments, the alert may comprise a message and/or may cause a message and/or alert to be presented that at least one of indicates that a drought related alert has been received and/or indicates that a drought related irrigation subsystem control scheme has been received. For example, when a drought condition occurs, an ODP 129 such as a municipal water authority may promulgate and/or require that irrigation within the municipality be undertaken according to prescribed limitations, such as irrigating a maximum of one day per week rather than a maximum of two days per week. In some embodiments, the ODP 129 may transmit at least one of the drought related alert and the drought related irrigation subsystem control scheme to the HVAC system 100. Alternatively, a CDP 131 such as a home automation service company may receive the at least one of the drought related alert and the drought related irrigation subsystem control scheme from the ODP 129 or some other source and then transmit one or both of the drought related alert and the drought related irrigation subsystem control scheme to the HVAC system 100. The method 800 may continue at block 806 where the HVAC system controller may, without first consulting a user and/or owner of the HVAC system 100, implement control of the irrigation subsystem in accordance with the drought related irrigation subsystem control scheme rather than a first irrigation subsystem control scheme that was previously being utilized to control the irrigation subsystem. In some embodiments, a similar method may be utilized to remove implementation of a drought related irrigation subsystem control scheme in response to an ODP removing a drought restriction and/or rescinding a drought related alert. In alternative embodiments, later received drought related irrigation subsystem control schemes may supplant and/or replace previously received drought related irrigation subsystem control schemes so that worsening or lessening drought conditions may trigger resultant changes in operation of the irrigation subsystem. In some cases, a manual or user-initiated override of the implementation of the drought related irrigation subsystem control schemes may be provided. In other embodiments, an override of a drought related irrigation subsystem control scheme may not be easily overridden by a user such as in cases where a secured access water supply valve associated with a water supply such as water resource supply 302 is remotely controlled by the ODP or the CDP. As such, in some embodiments, the HVAC system controller 106 may be configured to prevent overriding the remotely supplied drought related irrigation subsystem control scheme.

Figure 9:
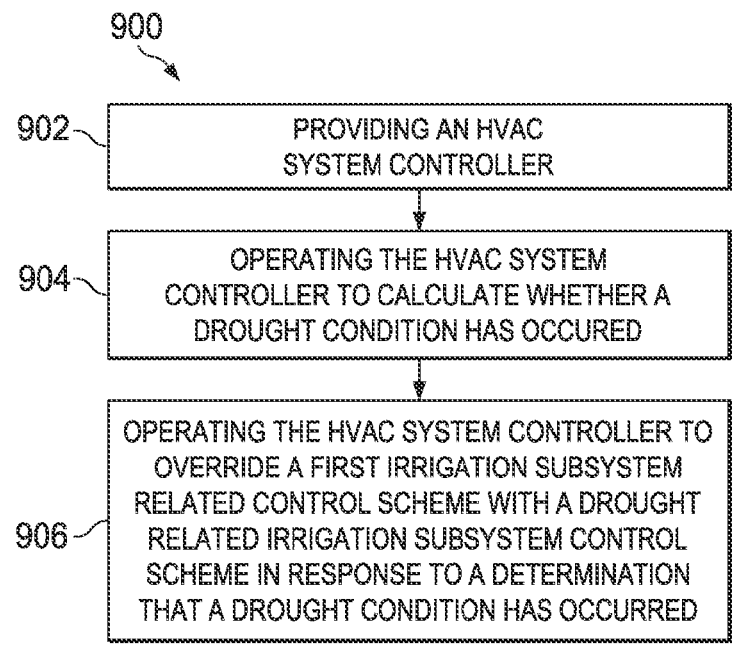
FIG. 9 is a flowchart of another method of operating an HVAC system.

Referring now to FIG. 9, a flowchart of a method 900 of operating an HVAC system such as HVAC system 100 is shown. The method 900 may begin at block 902 by providing an HVAC system controller such as system controller 106. In some embodiments, the system controller provided may comprise a wall mountable thermostat comprising a touch screen display/interface. The method 900 may continue at block 904 by operating the HVAC system controller to calculate whether a drought condition is occurring. For example, an HVAC system controller may utilize locally and/or remotely obtained weather data, local soil humidity data, and/or any other data suitable for use in determining whether a drought condition is occurring locally and/or regionally. In some embodiments, an alert may be sent to an ODP 129 such as a municipal water authority and/or a CDP 131 such as a home automation service company to notify the ODP 129 and/or the CDP 131 that a drought condition has been detected. The method 900 may continue at block 906 where the HVAC system controller may, selectively implement control of the irrigation subsystem in accordance with a drought related irrigation subsystem control scheme rather than a first irrigation subsystem control scheme that was previously being utilized to control the irrigation subsystem. In some embodiments, the drought related irrigation subsystem control scheme may be provided by the ODP 129 and/or CDP 131 in response to the drought notification sent to the ODP 129 and/or CDP 131. In some embodiments, a similar method may be utilized to remove implementation of a drought related irrigation subsystem control scheme in response to the HVAC system controller determining that a drought condition has changed or no longer exists. In alternative embodiments, later received drought related irrigation subsystem control schemes may supplant and/or replace previously received drought related irrigation subsystem control schemes so that worsening or lessening drought conditions may trigger resultant changes in operation of the irrigation subsystem. In some cases, an ODP or CDP may override the implementation of the drought related irrigation subsystem control schemes selected by a user with drought related irrigation subsystem control schemes required by the ODP or CDP In some cases, an HVAC system controller may provide information to an irrigation subsystem manager of an ODP or CDP to allow a personalized review of an impact implementation of a drought related irrigation subsystem control scheme may have on the environment associated with an HVAC system. The manager may be a human operator and/or may comprise a management system configured to customize a drought related irrigation subsystem control scheme for a particular HVAC system.

Figure 10:
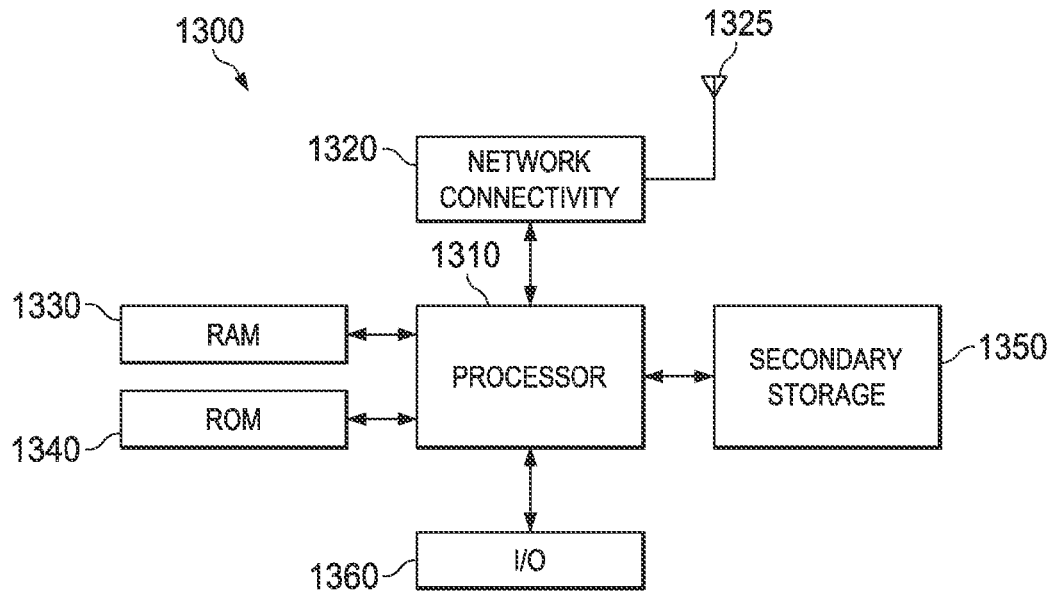
FIG. 10 is a simplified representation of a general-purpose processor (e.g. electronic controller or computer) system suitable for implementing the embodiments of the disclosure.

FIG. 10 illustrates a typical, general-purpose processor (e.g., electronic controller or computer) system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, optical disk, or other drive). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs or instructions that are loaded into RAM 1330 when such programs are selected for execution or information is needed.

The I/O devices 1360 may include liquid crystal displays (LCDs), touch screen displays, keyboards, keypads, switches, dials, mice, track balls, voice recognizers, card readers, paper tape readers, printers, video monitors, transducers, sensors, or other well-known input or output devices. Also, the transceiver 1325 might be considered to be a component of the I/O devices 1360 instead of or in addition to being a component of the network connectivity devices 1320. Some or all of the I/O devices 1360 may be substantially similar to various components disclosed herein.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A heating, ventilation, and/or air conditioning (HVAC) system, comprising:
    an irrigation subsystem; and
    an HVAC system controller both co-located with and coupled to the irrigation subsystem, wherein the HVAC system controller is configured to:
        determine whether a drought condition is occurring at a location of the irrigation subsystem;
        transmit a first message to a remote system that indicates occurrence of the drought condition at the location of the irrigation subsystem, wherein the remote system is remotely located from the irrigation subsystem;
        receive at least one of a drought related alert and a drought related control scheme for the irrigation subsystem in response to transmitting the first message that indicates the occurrence of the drought condition;
        display a second message in response to receiving at least one of the drought related alert and the drought related control scheme, wherein the second message indicates that at least one of the drought related alert and the drought related control scheme has been received; and selectively implement control of the irrigation subsystem according to the drought related control scheme in response to receiving the drought related control scheme at the HVAC system.

2. The HVAC system of claim 1, wherein the HVAC system controller is configured to generate the drought related alert.

3. The HVAC system of claim 1, wherein the HVAC system controller is further configured to selectively override the drought related control scheme.

4. The HVAC system of claim 1, wherein the HVAC system controller is further configured to selectively implement the drought related control scheme by displaying a prompt for user input related to whether to presently implement the drought related control scheme at the irrigation subsystem.

5. The HVAC system of claim 1, wherein the HVAC system controller is further configured to allow replacement of a previously remotely supplied drought related control scheme with a subsequently received second drought related control scheme for the irrigation subsystem.

6. The HVAC system of claim 1, wherein the HVAC system controller is further configured to notify the remotely located system of the occurrence of the drought condition and changes to the drought condition.

7. The HVAC system of claim 1, wherein the HVAC system controller is further configured to operate the HVAC system to provide at least one of heating, cooling, and air circulation to at least one zone conditioned by the HVAC system during the drought condition.

8. A heating, ventilation, and/or air conditioning (HVAC) system controller, comprising:
  a memory storing instructions;
  a processor coupled to the memory, wherein the instructions cause the processor to be configured to:
    determine whether a drought condition is occurring at a location of the irrigation subsystem;
    transmit a first message to a remote system that indicates occurrence of the drought condition at the location of the irrigation subsystem, wherein the remote system is remotely located from the irrigation subsystem;
    receive at least one of a drought related alert and a drought related control scheme for the irrigation subsystem in response to transmitting the first message that indicates the occurrence of the drought condition;
    display a second message that indicates at least one of the drought related alert and the drought related control scheme has been received in response to receiving at least one of the drought related alert and the drought related control scheme;
    selectively implement control of an irrigation subsystem according to the drought related control scheme in response to the HVAC system controller receiving the drought related control scheme; and
    operate the HVAC system to provide at least one of heating, cooling, and air circulation to at least one zone conditioned by the HVAC system during the drought condition.

9. The HVAC system controller of claim 8, wherein the instructions further cause the processor to be configured to generate the first message.

10. The HVAC system controller of claim 9, wherein the HVAC system controller comprises a wall mountable thermostat.

11. The HVAC system controller of claim 8, wherein the instructions further cause the processor to be configured to provide at least one of heating, cooling, and air circulation to at least one zone conditioned by the HVAC system during the drought condition.

12. A method, comprising:
  coupling a heating, ventilation, and/or air conditioning (HVAC) system controller to an irrigation system that is co-located with the HVAC system controller;
  determining whether a drought condition is occurring at a location of the irrigation subsystem;
  transmitting a first message to a remote system that indicates an occurrence of the drought condition at the location of the irrigation subsystem, wherein the remote system is remotely located from the irrigation subsystem;
  receiving at least one of a drought related alert and a drought related control scheme for the irrigation subsystem in response to transmitting the first message that indicates the occurrence of the drought condition;
  displaying a second message that indicates that at least one of the drought related alert and the drought related control scheme has been received in response to receiving at least one of the drought related alert and the drought related control scheme; and
  selectively implementing control of the irrigation subsystem according to the drought related control scheme in response to receiving the drought related control scheme at the HVAC system.

13. The method of claim 12, further comprising generating at least one of the drought related alert and the drought related control scheme at the HVAC system controller.

14. The method of claim 12, further comprising receiving one or more of the drought related control schemes from the remote system.

15. The method of claim 12, further comprising selectively implementing the drought related control scheme by receiving user input related to the drought related control scheme.

16. The method of claim 12, further comprising replacing the drought related control scheme with a subsequently received drought related control scheme for the irrigation subsystem.

17. The method of claim 12, further comprising coupling the HVAC system controller to the irrigation subsystem using a wall mountable thermostat.

* * * * *